United States Patent
McLemore et al.

(10) Patent No.: US 6,857,545 B2
(45) Date of Patent: Feb. 22, 2005

(54) BIKE CARRIER (76) Inventors: John D. McLemore, 105 Hickory Ct., Fortson, GA (US) 31906; Don McLemore, 450 Brown Ave., Columbus, GA (US) 31906

( * ) Notice: Subject to any disclaimer, the term of this patent is extended or adjusted under 35 U.S.C. 154(b) by 106 days.

(21) Appl. No.: 10/338,887

(22) Filed: Jan. 9, 2003

(65) Prior Publication Data

US 2003/0132259 A1 Jul. 17, 2003

Related U.S. Application Data (60) Provisional application No. 60/346,892, filed on Jan. 11, 2002.

(51) Int. Cl.$^7$ ................................................ B60R 9/06
(52) U.S. Cl. ...................... 224/519; 224/515; 224/520; 224/521; 224/525; 224/529; 224/530; 224/924
(58) Field of Search ................................ 224/514, 515, 224/519, 520, 521, 523, 524, 525, 526, 529, 530, 531, 924; 280/769

(56) References Cited

U.S. PATENT DOCUMENTS

| | | | |
|---|---|---|---|
| 3,163,339 A | 12/1964 | Merchant | 224/504 |
| 4,046,398 A | 9/1977 | Dunwoody | 224/519 |
| 4,204,702 A | 5/1980 | Oltrogge | |
| 4,318,501 A | 3/1982 | Graber | |
| 4,381,069 A | 4/1983 | Kreck | 224/502 |
| 4,403,716 A | * 9/1983 | Carlson et al. | 224/514 |
| 4,702,401 A | 10/1987 | Graber et al. | |
| 4,815,638 A | 3/1989 | Hutyra | |
| 4,823,997 A | 4/1989 | Krieger | |
| 4,863,080 A | * 9/1989 | Graber | 224/514 |
| 4,875,608 A | 10/1989 | Graber | |
| 5,025,932 A | 6/1991 | Jay | |
| 5,038,980 A | 8/1991 | Baldeck | |
| 5,118,018 A | 6/1992 | Baldeck | 224/42.03 |

(List continued on next page.)

OTHER PUBLICATIONS

"Outdoor Cooking Made Simple, e.g. Gas & Charcoal Smokers—Turkey Fryers—Fish Fryers, Camp Cookers—Cookware—Spices—Videos—Cargo Carriers", 1992, pp. 21–22, Masterbuilt Mfg. Inc., Camping Supply Publication (25 Years).

Camping World "Master 1997" brochure, p. 36.

*Primary Examiner*—Gary E. Elkins
(74) *Attorney, Agent, or Firm*—Smith, Gambrell & Russell (57) ABSTRACT

A bike carrier which includes a U-shaped frame structure having an intermediate section and first and second leg sections. A first rail is supported by the frame structure and laterally spans between said first and second legs and extends out past at least one of said legs and preferably both in cantilever fashion. A carrier mount having a frame attachment device and a vehicle attachment device is provided for securing the U-shaped frame to a vehicle. Additionally preferably provided is a securement device supported by the U-shaped frame and extending upwardly from that frame. The securement device includes a lock receptor at an upper end for enabling locking of a bike to the carrier and provides an additional strap down location. Preferably a pair of bike support rails are spaced apart along the legs and each extend laterally out away from opposite outer sides of said legs to provide cantilever extensions to each side of the U-shaped frame structure. In addition one and preferably two adjustable cradle wheel mounts are provided on each rail, with at least some of the wheel mounts being slideably received by a respective one of the cantilever extensions provided by the rails.

33 Claims, 5 Drawing Sheets

U.S. PATENT DOCUMENTS

| | | |
|---|---|---|
| 5,215,233 A | 6/1993 | Baldeck |
| 5,232,135 A * | 8/1993 | Marren ................... 224/520 |
| 5,269,446 A | 12/1993 | Biehn |
| 5,373,978 A | 12/1994 | Buttchen et al. ......... 224/42.03 |
| 5,377,886 A | 1/1995 | Sickler |
| 5,469,997 A | 11/1995 | Carlson .................... 224/521 |
| 5,476,202 A | 12/1995 | Lipp ....................... 224/532 |
| 5,476,203 A | 12/1995 | Fletcher ................... 224/924 |
| 5,497,927 A | 3/1996 | Peterson .................. 224/519 |
| 5,549,231 A | 8/1996 | Fletcher et al. ............ 224/924 |
| 5,570,825 A | 11/1996 | Cona ....................... 224/495 |
| 5,699,985 A | 12/1997 | Vogel ...................... 224/924 |
| 5,820,004 A | 10/1998 | Lane |
| 5,833,074 A | 11/1998 | Phillips |
| 5,836,494 A * | 11/1998 | Grunsted et al. ........... 224/521 |
| 5,850,959 A | 12/1998 | Miller |
| 5,862,966 A | 1/1999 | Mehls |
| 5,884,824 A | 3/1999 | Spring, Jr. |
| 5,884,930 A | 3/1999 | Clutch ..................... 224/521 |
| 6,006,973 A | 12/1999 | Belinky et al. ............. 224/924 |
| 6,125,480 A * | 10/2000 | Soffar et al. ............... 224/519 |
| 6,336,580 B1 * | 1/2002 | Allen et al. ................ 224/519 |
| 6,491,195 B1 | 12/2002 | McLemore et al. ........ 224/537 |
| 6,547,116 B2 * | 4/2003 | Anderson et al. .......... 224/924 |

* cited by examiner

BIKE CARRIER

CROSS REFERENCE TO RELATED APPLICATIONS

The present invention claims priority under 35 U.S.C. §119(e) to provisional patent application No. 60/346,892 filed on Jan. 11, 2002 and which is incorporated herein by reference in its entirety.

FIELD OF THE INVENTION

The present invention is directed at a bike carrier which is connectable to a vehicle and can securely retain one or a plurality of bikes of the same type or different types.

BACKGROUND OF THE INVENTION

A variety of bike carriers are in existence including those which mount on the top of vehicles (see U.S. Pat. Nos. 5,884,824 and 4,702,401) and those which are fixed by way of straps secured to the vehicle body itself (see U.S. Pat. Nos. 5,215,233; 5,038,980 and 4,875,608). Additionally there are bike carriers which are mounted on trailer hitches (see U.S. Pat. Nos. 5,497,927; 5,377,886 and 5,025,932) or on vehicle bumpers (see U.S. Pat. Nos. 5,269,446 and 4,815,638). A review of the prior art devices reveals that they suffer from a variety of drawbacks such as not being highly versatile in accepting a variety of bike types, being difficult to assemble or install, not being versatile relative to different types of vehicles, not providing for secure attachment during transit and/or not being well suited for precluding theft of a bike from a carrier.

SUMMARY OF THE INVENTION

The present invention is directed at providing a highly versatile bike carrier which facilitates resolving or reducing some of the problems associated with the prior art. Versatility is facilitated by providing structure which can be readily interchanged and/or repositioned for accommodating different situations faced.

Under a preferred embodiment of the present invention, a bike carrier is provided comprising a U-shaped frame structure having an intermediate section and first and second leg sections. A first rail is supported by the frame structure and laterally spans the first and second legs and extends out past at least one of the legs in cantilever fashion. In addition, a carrier mount having a U-shaped frame attachment means or attachment device and a vehicle attachment means or vehicle attachment device is provided with the U-shaped frame attachment device being secured (directly or indirectly) to the U-shaped frame at one end and to the vehicle (directly or indirectly) at an opposite end.

In a preferred embodiment a securement device is provided and supported by the U-shaped frame so as to extend upwardly therefrom. The carrier also preferably comprises releasable securement means provided on the intermediate section and each of the legs of the U-shaped frame to enable the release and securement of the securement device to either one of said legs or said intermediate section. The securement device preferably includes a vertically rising post and a lock receptor provided on the post (e.g., a bent bar welded at opposite ends to the post).

A preferred embodiment also features a second rail arranged parallel to the first rail and wherein the first and second rails extend between and out past each of the outer sides of the legs to provide an opposite side cantilever arrangement in each rail. These rails are spaced apart along the length of the legs and parallel to the intermediate section and are also spaced away from the intermediate section. The intermediate section preferably has an extended length such as a length of at least 35% and more preferably 50% or more of the length of the rail. A preferred embodiment of the invention further includes a pair of wheel mounts positioned on opposite ends of the rail and/or rails and with at least one being adjustable along an end region of the supporting rail. Suitable wheel mounts include U or V-shaped cradles with sliding bases that can be moved and fixed in position relative to a cantilever portion of the rails.

The intermediate section of the U-shaped frame provides an attachment location for the U-shaped frame attachment device which is secured to the intermediate section of the U-shaped frame. An example of an attachment device includes a bar having a fastening plate and fasteners for attaching the plate to the intermediate section. The fastening plate preferably extends along at least 10% and more preferably 20% or more of the length of the intermediate section and with fastener locations to opposite sides of the bar. Also, the bar preferably features hitch pin receptor holes at an end opposite that on which the fastening plate is provided. One embodiment features an L-shape bar having a reception collar instead of a hitch pin hole set at an end of the bar.

An embodiment of the invention includes a securement device having a main post and a base flange having bolt holes positioned to opposite sides of the main post for use in securing the securement device to the U-shaped frame structure. In a preferred embodiment, there is further provided three pairs of bolt holes which are intermediately positioned respectively on the legs and intermediate section.

As one example of the versatility of the present invention, there is provided a U-shaped frame attachment device that includes first and second framing bars and bumper clamps on a first end of each of the framing bars and affixing means for affixing the framing bars to a respective one of the legs. Each framing bar also preferably includes a pair of bolt holes which are aligned with pairs of bolt holes provided in the legs. Thus, the bolt holes in the legs can be aligned with fasteners used for securing the securement device to either of the legs, and those fasteners can also connect the leg to the framing bar. Suitable bumper clamps include U-bolts with U-bolt reception holes provided on an end region of each of the framing bars. Also the framing bars are preferably designed such that either end can be placed under the bumper without disrupting the connection function for each end relative to the bumper and legs. An embodiment of the invention features the securement device, one of the legs and one of the framing bars in a stacked arrangement with all three sharing a common cross-sectional vertical plane and with the legs preferably in an intermediate position within the stack.

An alternate embodiment of the carrier device further comprises a second rail spaced apart from a first rail along the legs and parallel thereto, a first beam secured to a first of the legs and extending in a direction out away from a free end of the first leg, and a second beam secured to a second of the legs and extending in a direction out away from a free end of the second leg in a stacked arrangement. Further featured is a third rail supported by and extending between and laterally out away from the opposite outer sides of the beams. In a preferred embodiment the first and second rails are permanently affixed (e.g., welded) to the U-shaped frame and the third rail is preferably releasably secured to the beams and extends parallel to the first rail. Further provided is a third rail wheel mount which is adjustably received by a cantilevered end region of the third rail. A fourth rail can also be provided with each of the third and fourth rails extending in cantilever fashion to an outer side of each of said first and second beams. An embodiment also includes a securement device that is in a stacked arrangement with one of the legs or U-shaped frame structure and a second one in a stacked relationship with a beam, with one or more fasteners extending through aligned reception holes in the stacked arrangement. The beams are preferably designed to have common configuration with each having means for receiving a securement device.

The present invention also features a U-shaped frame having an intermediate section and first and second legs, a vehicle mount device having a vehicle connection means and U-shaped frame attachment means. Further included is a pair of rails which are spaced apart along the legs and each extend laterally out away from opposite outer sides of the legs to provide cantilever extensions to each side of the U-shaped frame structure. A preferred arrangement further comprises a wheel mount provided on each of the rails, with the wheel mount being slideably received by a respective one of the cantilever extensions. An additional feature preferably provided under the present invention includes a securement device with each of the intermediate section and legs having securement means for securing the securement device in three optional positions, with the securement device having a vertically rising post and a lock receptor on the post. The securement means can be one which includes a fastener which also secures the vehicle mount device to the U-shaped frame structure. For example, there can be provided a fastener that extends through the base of the securement device and the intermediate section.

BRIEF DESCRIPTION OF THE INVENTION

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figures 1, 2, 3, 4:
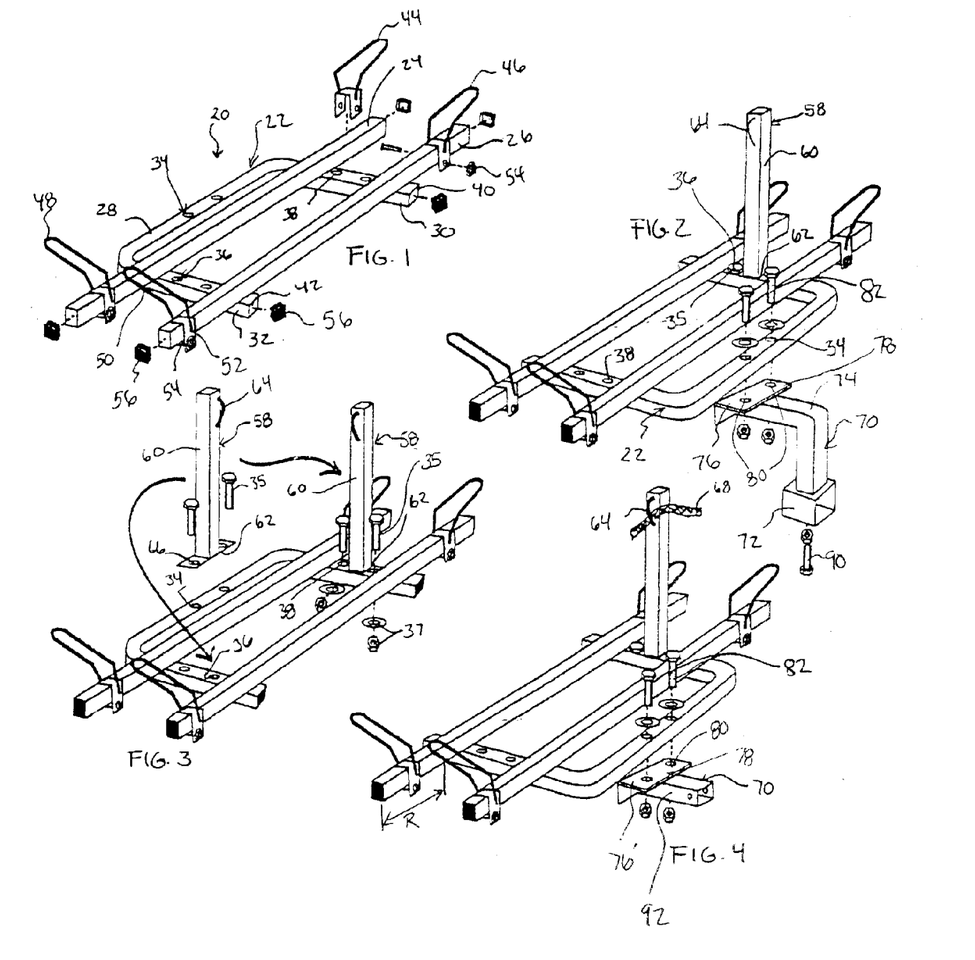
FIG. 1 shows a U-shaped frame structure with cantilevered bike rails for use with a vehicle to U-shaped frame attachment device.
FIG. 2 shows a view similar to FIG. 1 with an added view of an attachment device and a securement device fixed in position.
FIG. 3 shows a view of the U-shaped frame structure and optional positioning of the securement device.
FIG. 4 shows an alternate embodiment of the invention with a different attachment device.

FIG. 1 illustrates an embodiment of the present invention featuring bike support assembly 20 comprising frame structure 22 supporting first and second rails or runners 24, 26 supported by frame structure 22. As shown in FIG. 1, a preferred embodiment of the frame structure 22 features a U-shaped frame structure having intermediate section 28 and legs 30, 32. In a preferred embodiment, U-shaped frame structure is a unitary or monolithic structure such as a solid or tubular beam having a U-shaped configuration (e.g., a U-shaped bent bar).

FIG. 1 further illustrates fastener hole(s) (preferably paired sets) or securement means 34, 36, 38 respectively positioned on the intermediate section 28, first leg 30 and second leg 32. In a preferred embodiment the securement means comprise one or more fastener insertion holes (e.g., a pair of through-holes) with a corresponding number of bolt or pin fasteners 35 preferably with washer and nut combinations 37 or some other securement means such as a clamping device or a key slot and key combination, as a few examples. The securement means are preferably provided at an intermediate location on the legs and the intermediate section of the U-shaped frame.

The embodiment of FIG. 1 further illustrates bike support rails 24 and 26, preferably permanently affixed as by welding to legs 30, 32 in an area of overlap so as to extend transverse to the direction of elongation of the legs and to extend out to opposite outer sides of the legs 30 and 32. Also, the rails 24 and 26 are preferably unitary structures (e.g. hollow or solid metal tubes) and of a sufficient length to accommodate maximum adult bike sizes on the market ("bikes" being used in a broad sense to cover both man-powered and non-manpowered wheeled vehicles or hybrids of the same). Bike support rails of 5 feet +/−12 inches is preferred with a majority of rail length (at least relative to one cantilever end length and preferably relative to the sum of opposite cantilever ends) falling between the interior spacing of the legs of the U-shaped frame structure which is commensurate with the total length of elongation of intermediate section 28 shown in FIG. 1.

As further illustrated in FIG. 1 rails 24 and 26 are also spaced apart in the direction of elongation (e.g., a 4 to 18 inch spacing with a 6 inch spacing being well suited for accommodating many bike widths) and with the legs having an elongation length of about twice of that of the rail spacing (from the interior edge to interior edge of the juxtaposed runners).

The spacing of rails 24 and 26 along the legs also provides a region for free access to the securement means (e.g. 36 and 38) therebetween. Also the rails 24 and 26, in addition to being spaced apart from each other are also preferably spaced inward of intermediate section 28 and the free ends 40, 42 of legs 30 and 32 (e.g., a 2 to 8 inch spacing therefrom). In this way, securement means 34 of the intermediate section is not covered or blocked for easy access during securement.

FIG. 1 further illustrates wheel mounts 44, 46, 48 and 50, which are received on respective free end regions of rails 24 and 26. In a preferred embodiment wheel mounts 44, 46, 48 and 50 are cradle arms having U-shaped or V-shaped wheel reception support brackets in the form of bent bars, for example, which extend obliquely longitudinally out away and upward from the end regions of the rails 24 and 26. With this arrangement the rails overall length can be made relatively smaller than front to rear lengths of adult bikes as the support brackets extend outward to accommodate for example 6 to 8 inches of wheel diameter at the maximum longitudinal ends of the bike (e.g. a 57 inch bike with a 72 inch maximum accommodation when the cradles are in their maximum outer position).

Wheel mounts 44, 46, 48 and 50 also preferably comprise a slideable base 52 (e.g., a U-shaped base bracket) with compression means 54 such as a nut and bolt combination extending through reception holes in the legs of the base to provide for fixed positioning of the wheel mounts at desired rail positions and, upon loosening, sliding adjustment between the free ends of the rails and the adjacent rail exterior rail sides (e.g., see adjustment range R in FIG. 4). Additional wheel securement means (e.g., as a replacement for each or some or as a supplemental securement means) is featured in the present invention such as tie-down straps which extend between spokes of a wheel and wrap around the wheel rim and the rail below. An illustration of tie down straps S can be seen in FIG. 9.

Preferably the spacing of legs 30 and 32 and the length of rails 24, 26 are designed for providing an overhang or cantilever relationship in the end regions of respective rail ends. An overhang of 33% or less (relative to the total length of a rail) between the external side of the legs 30 and 32 and the closest free end of the overhanging rails represents a suitable range "R". A range of 15% to 25% overhang relative to the overall length of the rails at each end thereof is well suited for many uses of the present invention. The free ends of the preferably hollow tube rails are further shown in FIG. 1 to be capped off with caps 56 provided at each free end of the rails as well as the two open ends of the legs of the preferred hollow, U-shaped frame structure. Various other types of wheel mounts are also possible such as blocks with wheel reception grooves or bracket members (e.g. ones that support wheel locks or strapping). The illustrated wheel mount arrangement is preferred in that it provides for rapid adjustment of either or both of the wheel mounts on a common rail until the opposite tires of the bike are compressed within and against the U- shaped or V-shaped bent bars of the wheel mounts. The bolts or other compression means such as an over-center latch arrangement (not shown) are engaged to secure the wheel mounts in the desired locations on the rails.

Figure 9:
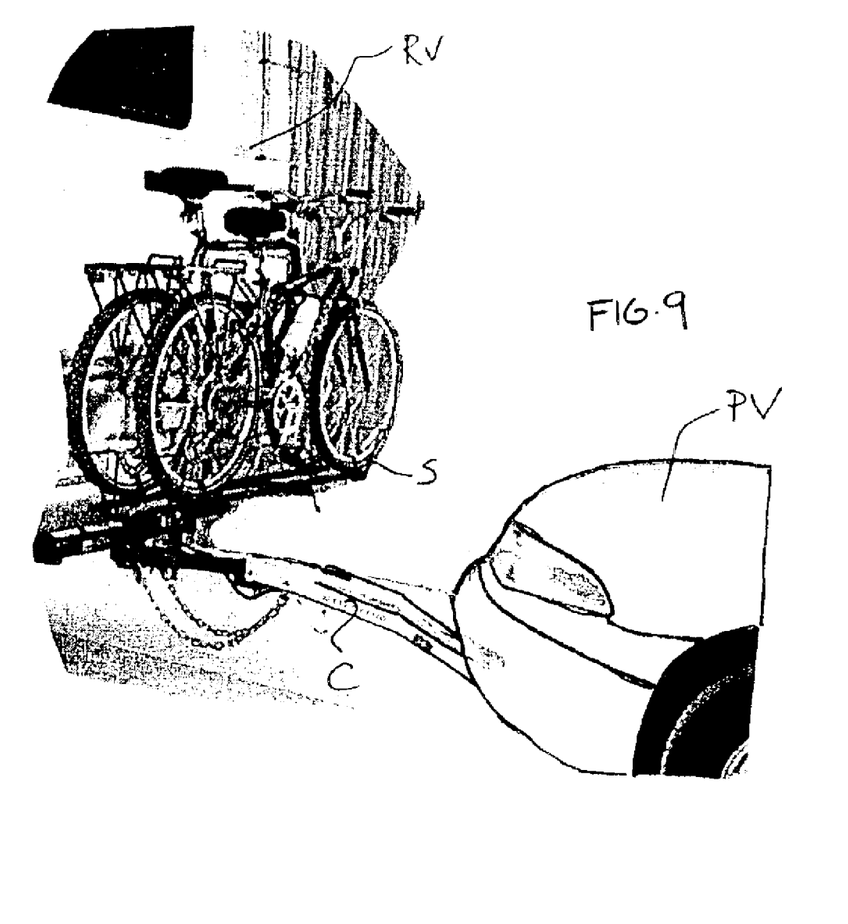
FIG. 9 shows the embodiment of FIG. 8 attached to a recreation vehicle (RV) and with the tow ball assembly for supporting a towed member such as the illustrated passenger vehicle.

By having two rails side by side with four wheel mounts there is easily positioned two bikes (of similar or quite diverse sizes such as an adult and child's bike) in side by side and locked down arrangement. FIG. 9 illustrates an example of two somewhat different bikes supported on the carrier device of the preset invention. To provide sufficient adjustment overhang for the wheel mounts along the cantilevered portions of the rails 24 and 26 while also providing for a stable support, U-shaped frame structure 22 preferably has its intermediate section 28 of a greater length than the illustrated equal length legs 30 and 32. An arrangement with a ratio range of L/I of 6 to 9 and more preferably 0.75 to 0.85 with intermediate section length (I) and leg length (L) is illustrative of a preferred arrangement of the present invention. In a preferred embodiment the merging area between the ends of the intermediate section and respective legs are smooth curved. Also, in a preferred embodiment, the U-shaped frame structure is an underlying relationship relative to the rails 24 and 26, although a reverse arrangement is an alternate embodiment of the invention.

With reference to FIGS. 2 and 3, bike support assembly 20 further comprises securement device 58 having securement arm 60 (shown in a preferred vertical extension embodiment) and fastening base 62. At the opposite, free end of arm 60 is provided securement ring or catch 64. In the embodiment illustrated in FIGS. 2 and 3, fastening base 62 is a plate or flanges extending to opposite sides of the securement arm 60 and having joining means such as fastener holes 66 which work in conjunction with a desired one of securement means 34, 36 and 38 to provide for the releasable affixing of securement device 58 at any one of the desired securement means locations 34, 36 and 38. Securement device 58 provides for added stability of the bike or bikes supported on the support frame device during transit, for example, by providing for an upper strap attachment location for connection with an upper region of a bike either in a taught arrangement or in a loose arrangement. This provides a degree of movement limitation and a fail safe relative to bike movement (e.g., avoids a bike bouncing out of position or off the carrier entirely during rough terrain travel).

In addition, by having securement catch or ring 64 designed for closed off or non-removable lock cable (or other bike lock devices flexible or non-flexible) connection, there is provided a convenient means to lock a bike to the bike carrier. As shown in FIG. 2, for example, catch 64 is provided at the upper end region of arm 60 (e.g., preferably located in the upper third or upper quarter portion of arm 60) and flexible cable or chain lock 68 extends through the catch and is locked at its ends (not show) around a bike.

The present invention is highly versatile in providing multiple options for positioning of securement arm 60 such as the three options shown by the combination of FIGS. 2 and 3 showing the securement arm 60 in each of the securement means locations 34, 36 and 38. This versatility allows a user to choose the best position relative to the bikes normally carried by the user and the type of locking arrangement deemed most desirable. This versatility is enhanced with the ease of bike length adjustability made possible by the adjustable wheel mounts provided at the cantilevered sections of the rails, while the otherwise maximized leg spacing of the U-shaped frame structure provides a stable, low degree of front to back rotational tilting in that outer end portions of the bikes and rails are supported directly below by the U-shaped frame and yet the carrier device is capable, if desired, of being attached at a central location via the intermediate section 28. Modifications or initial positioning of securement device 58 is easily carried out either upon purchase of the carrier or at a later date (e.g., a change in bike types) by securement of the securement means and the base fixing means 62 of the securement device 58. Also, while a single securement device at one of the noted possible choices is a preferred arrangement, a multiple securement arm arrangement is also featured under the present invention having, for example, two securement devices 58 at two of the possible three locations or three securement devices on each of the three securement means locations.

Figure 5:
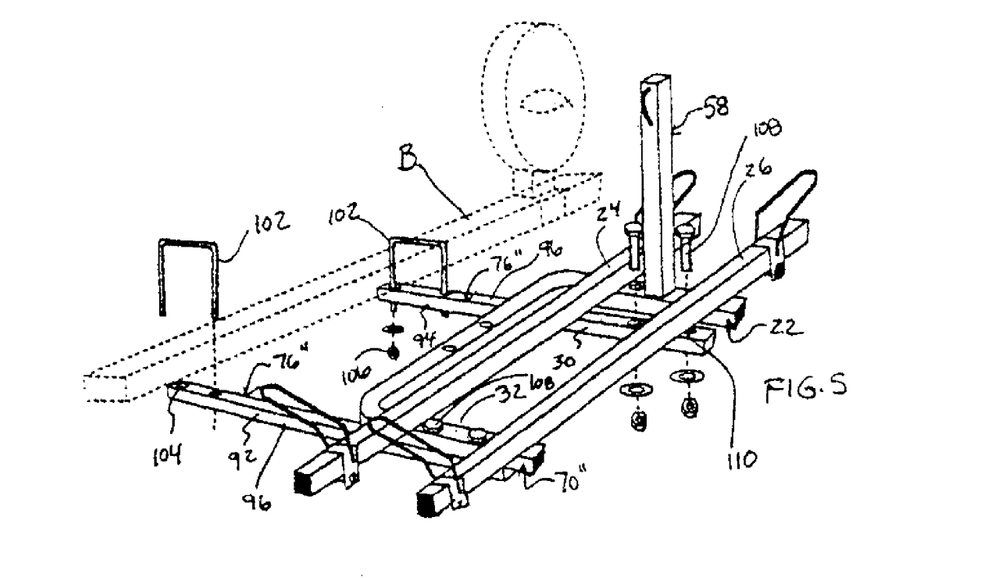
FIG. 5 shows another alternate embodiment of the invention with a different attachment device.

FIGS. 3, 4 and 5 illustrate the present invention being highly versatile in providing the foundation for different types of rear vehicle securement. FIGS. 2, 7, 8 and 9 illustrate a first carrier mount embodiment 70 which is in the form of a collar carrier mount having collar 72 from which extends (e.g. a welded attachment) collar arm 74 which in the illustrated embodiment is an upwardly extending arm with an L-shape with the upper leg 76 extending out away from the vehicle attachment location (see FIGS. 8 and 9). At the outer, free end of collar arm 74 is provided frame mount 76 which is welded or otherwise fixed to collar arm 74. Frame mount 76 is designed for attachment with the intermediate section 28 of frame structure 22 such as coincident with securement means 34 which can function solely as the means of affixing frame structure 22 to frame mount 76 or can be affixed in conjunction with securement device 58 as exemplified by the non-attached, central positioned securement device 58 in FIG. 3. Frame mount 76 is shown in FIG. 2 in a preferred angle bracket embodiment having bolt holes positioned in the upper horizontal plate section 78 of the bracket shaped frame mount 76. Thus, when frame mount 70 is secured coincident with securement device 58, fasteners 35 with nut and washer combinations can be used to fasten both the securement device 58 and the frame mount 76 on opposite upper/lower sides of the intermediate section 28 (or in direct contact sandwich arrangement if an alternate mount bracket arrangement is used (e.g. one with a fastening plate positionable on the upper surface of intermediate section 28). If, instead, the securement device is provided at an alternate location (and is present—noting the possibility of an alternate embodiment free of any securement device), an additional fastener arrangement is provided such as another pair of bolt assemblies 82 (FIG. 4).

Figure 7:
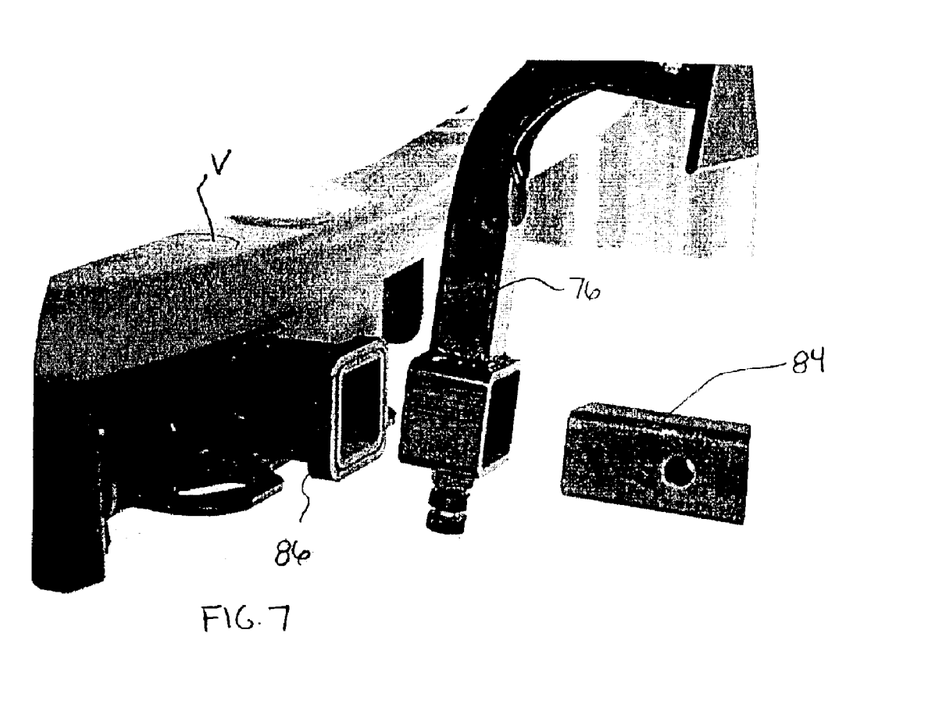
FIG. 7 shows the embodiment of FIG. 2 in an unassembled state ready for connection to a vehicle and a tow ball assembly.
Figure 8:
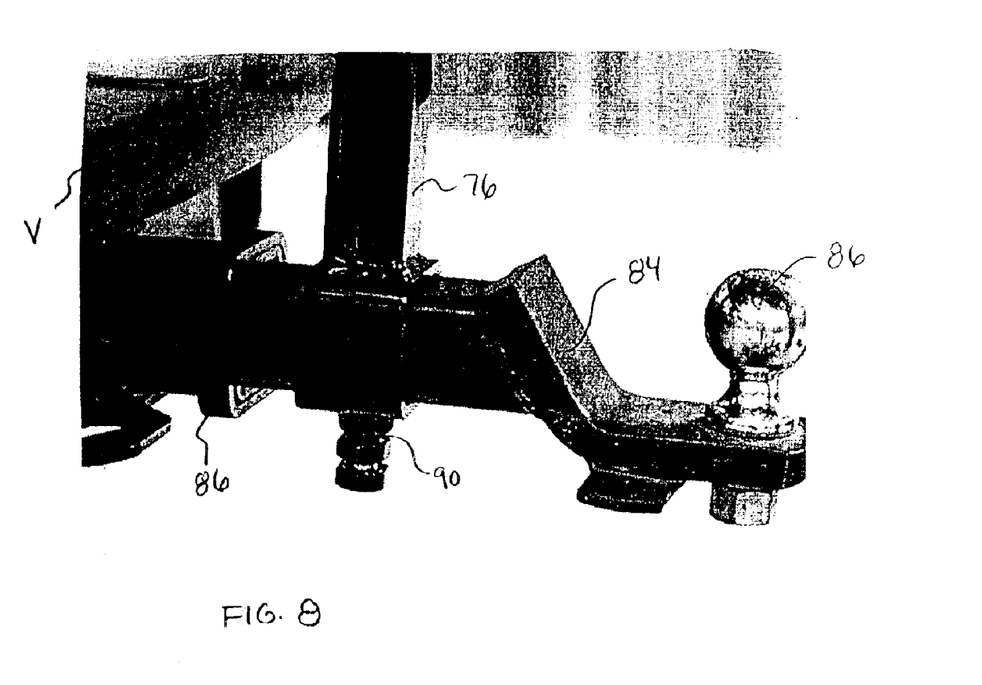
FIG. 8 shows the arrangement of FIG. 7 in an assembled state.

FIGS. 7, 8 and 9 illustrate collar frame mount 76 in use with a conventional tow ball mount 84 designed for receipt by a standard vehicle trailer hitch receiver 86. As seen from FIG. 8, the tow ball mount assembly 84 is fed through collar 72 and the interior end of tow ball mount assembly 84 is received into hitch receiver 86 and fixed in place with a hitch pin (not shown). To axially fix collar 72 relative to the insertion beam portion of tow ball mount assembly 84, tow ball tension bolt/double nut combination 90 can be utilized. Collar arm 74 is preferably designed to provide a 4 to 24 inch rise in bracket plate 78 relative to an embodiment such as that shown in FIG. 4. In this way, there is provided sufficient clearance space for manipulation of a tow ball carrier (C-FIG. 9) attached to a passenger vehicle PV which is being towed by an RV.

FIG. 4 shows an alternate carrier mount 70' having a straight tube designed for direct insertion into a tow hitch like 86 in FIG. 7. Carrier mount 70' has a frame mount 76' having a similar mounting means as in FIG. 2 which in the preferred embodiment features an angle bracket mount which has the underside of plate 78 fixed to the non-insertion end of receiver beam 92 with that end also preferably welded or otherwise affixed to the vertical component of the angle bracket of frame mount 76'. The opposite end of beam 92 has the standard hitch pin reception aligned holes for locking in position relative to a vehicle trailer hitch as shown in the embodiment of FIG. 7 extending from the rear of a vehicle V. Plate 78 preferably has its elongated length of about 8 to 14 inches (e.g. a 10 to 12 inch bolt hole spacing) to provide for clearance for the receiver beam and provide lateral support to the U-shaped frame to lessen the potential for rolling or twisting of the carrier relative to the centralized receive hitch.

FIG. 5 shows an additional embodiment of the present invention suited for bumper attachment rather than a trailer hitch attachment. In FIG. 5 there is illustrated bumper B such as a bumper commonly found on RV's and other vehicles. In this embodiment carrier mount 70" comprises frame mounts 76" that entail bumper affixing ends for a pair of framing bar assemblies (92,94) with each framing bar assembly illustrated as having main bar 96. Main bar 96 for each assembly has a length which provides for extension below a bumper and with some degree of overlap relative to a respective leg (30,32). Each main bar also has first and second affixing means, with the first affixing means including a bumper attachment assembly 102 featuring a U-shaped clamp with threaded ends insertable into reception holes 104 in the first end of the main bar and secured by a nut 106 which combination provides frame mount 76" of the carrier. At the opposite end of each main bar 96, second affixing means is provided which, in the illustrated embodiment, comprises a pair of bolt/nut combinations which are of a length sufficient to pass through the leg fastener holes 36 and 38 described above and through second fastener hole pairs 110 at the opposite end of the main bars. As seen from FIG. 5, the securement device 58 can be also secured in position in a stacked arrangement with the bolts 108 providing the same function as fasteners 66 described above (can be one in the same or a different length bolt set to accommodate the extra main bar vertical thickness). In a preferred embodiment the main bars have a length of 1.5 to 3 times (e.g., 2 times) that of a leg and equal to or less than the length of a rail.

To mount the carrier device to a bumper, the main bars are inserted below the bumper and the U-bolts 102 passed over and past the bumper and through the receiving holes 104. Thus upon the nuts being tightened on the threaded ends of the U-bolts the carrier device is secured to the vehicle. Also, by utilizing the same securement arm fastening holes on the legs either with or without the securement device as the bumper beam 92,94 affixing means there is provided an efficient use of components.

Figure 6:
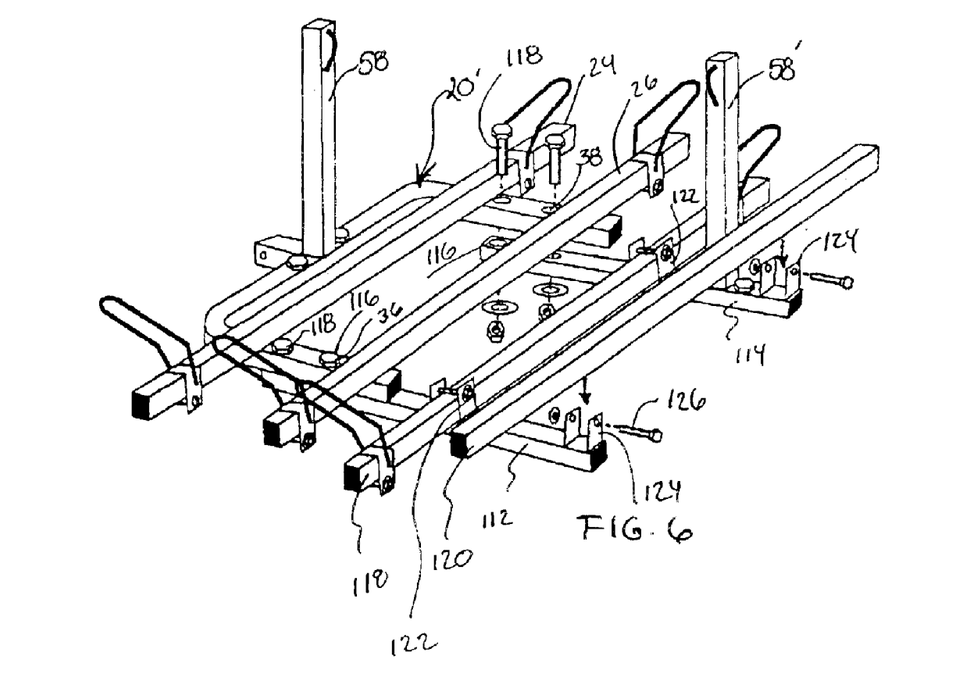
FIG. 6 shows an alternate embodiment of the invention with added bike support rails.

FIG. 6 illustrates an alternate embodiment of a bike support assembly 20' which is designed to accommodate more than two bikes such as three or four bikes. Support assembly 20', like the embodiment described above, includes the U-shaped frame structure 22, the pair of rails 24, 26, securement device 58, a received mount (one similar to the embodiment of FIG. 4 as an example). As shown in FIG. 6, carrier 22' includes added bike beams 112 with each including fixing means such as the combination of fastener hole pairs 116 provided in a first end region of added bike beams 112, 114 and bolt/nut combinations 118 of a sufficient length to provide for attachment of the added bike beams by way of the bolts passing through fastener holes 36 and 38 in legs 30, 32 and enabling a clamping of the added beams to the legs. FIG. 6 further illustrates added beams being attached to the underside of the legs which is preferred when the first and second bike rails 24 and 26 are integrated with the U-shaped frame such as by welding, although a releasable attachment arrangement is also possible under the present invention using, for example, the below described attachment devices for the third and fourth rails (118,120) which third and fourth rails support wheel mounts or some other means of end region bike attachment at their free ends.

FIG. 6 also shows added bike rail beams 112, 114 each having first and second rail mounts 122, 124, which preferably comprise C-shaped clamps welded or releasably affixed (e.g. bolts) to the free ends of beams 112, 114 and having upstanding legs which are spaced to the same width of the added rails or at slightly more thereto (e.g., ¼ inch or less) and each having position retention means such as the compression bolt/nut combination 126 shown in FIG. 6. In addition, the spacing between the C-shaped clamps is preferably designed to accommodate a secondary securement device 58' which in a preferred embodiment is the same design or interchangeably designed relative to securement device 58 of FIG. 1. Thus, in FIG. 6 there is sufficient spacing to accommodate the length of securement device base 62. Rails 118 and 120 are positioned within aligned C-clamps and fixed in position with bolts 126. A third and a fourth bike can thus be mounted on rails 112 and 114 and fixed in place with wheel mounts such as wheel mount 46 shown in FIG. 1 (only one pair shown on rail 118 and not on rail 120 to illustrate the preferred releasable nature of the wheel mounts to facilitate sliding on the cantilevered portion of rails 118 and 120). As with the FIG. 1 embodiment the securement device 56' can be optionally positioned on either rail 118, 120. Also, while not shown, in addition to cradle wheel mounts buckle or Velcro strap fasteners are utilized around the rims of the bike being secured and around the supporting rail as can be seen in FIG. 9.

While several embodiments of the invention have been shown and described, it will be apparent to those skilled in the art that modifications may be made therein without departing from the scope and spirit of the present invention.

What is claimed is:

1. A bike carrier, comprising:
   a U-shaped frame structure having an intermediate section and first and second leg sections;
   a first rail supported by said frame structure and laterally spanning said first and second legs and extending out past at least one of said legs in cantilever fashion;
   a carrier mount having a U-shaped frame attachment device and a vehicle attachment device, and said U-shaped frame attachment device being secured to said U-shaped frame; and
   a securement device supported by said U-shaped frame and extending upwardly therefrom.

2. The carrier of claim 1 further comprising releasable securement means provided on said intermediate section and legs of said U-shaped frame to enable the release and securement of said securement device to either one of said legs or said intermediate section.

3. The carrier of claim 2 wherein said securement device includes a vertically rising post and a lock receptor provided on said post.

4. The carrier of claim 1 wherein said securement device includes a vertically rising post and a lock receptor provided on said post.

5. The carrier of claim 1 further comprising a second rail arranged parallel to said first rail and wherein the first and second rails extend between and out past each of the outer sides of said legs to provide an opposite side cantilever arrangement in each rail.

6. The carrier of claim 5 wherein the rails are spaced apart along the length of said legs and parallel to said intermediate section and also spaced away from said intermediate section.

7. The carrier of claim 1 wherein said intermediate section has a length of at least 50% of the length of said rail.

8. The carrier of claim 1 further comprising a pair of wheel mounts positioned on opposite ends of said rail and with at least one being adjustable along an end region of said rail.

9. The carrier of claim 1 wherein said U-shaped frame attachment device is secured to the intermediate section of the U-shaped frame.

10. The carrier of claim 9 wherein said U-shaped frame attachment device comprises a bar having a fastening plate and fasteners for attaching said plate to said intermediate section.

11. The carrier of claim 10 wherein said fastening plate extends along at least 10% of the length of said intermediate section and includes fastener locations to opposite sides of said bar.

12. The carrier of claim 10 wherein said bar has hitch pin receptor holes at an end opposite that on which said fastening plate is provided.

13. The carrier of claim 10 wherein said bar has an L-shape and includes a reception collar at one end of said bar.

14. The carrier of claim 1 wherein a pair of wheel mounts are provided on said first rail and said wheel mounts include cradles that are sliding adjustable along cantilever end regions provided at each end of said rail outside of said legs.

15. The carrier of claim 1 wherein said securement device comprises a main post and a base flange having bolt holes to opposite sides of said main post for use in securing said securement device to said U-shaped frame structure.

16. The carrier of claim 15 wherein said U-shaped frame structure includes three pairs of bolt holes which are intermediately positioned respectively on said legs and intermediate section.

17. The carrier of claim 1 wherein said U-shaped frame attachment device includes first and second framing bars and bumper clamps on a first end of each of the framing bars and affixing means for affixing said framing bars to a respective one of said legs.

18. The carrier of claim 17 wherein said framing bars include pairs of bolt holes which are aligned with pairs of bolt holes provided in said legs.

19. The carrier of claim 18 wherein said bolt holes in said legs are aligned with fasteners used for securing said securement device to either of said legs.

20. The carrier device of claim 17 wherein said bumper clamps include U-bolts and U-bolt reception holes provided on an end region of each of said framing bars.

21. The carrier device of claim 17 wherein said securement device, one of said legs and one of said framing bars are in a stacked arrangement.

22. The carrier device of claim 1 further comprising
   a second rail spaced apart from said first rail along said legs;
   a first beam secured to a first of said legs and extending in a direction out away from a free end of said first leg;
   a second beam secured to a second of said legs and extending in a direction out away from a free end of said second leg;
   a third rail supported by and extending between and laterally out away from said beams.

23. The carrier device of claim 22 wherein said first and second rails are permanently affixed to said U-shaped frame and said third rail is releasably secured to said beams and extending parallel to said first rail.

24. The carrier device of claim 22 further comprising a third rail wheel mount which is adjustably received by a cantilevered end region of said third rail.

25. The carrier device of claim 24 further comprising a fourth rail and each of said third and fourth rails extend in cantilever fashion to an outer side of each of said first and second beams.

26. The carrier device of claim 22 wherein said securement device is in a stacked arrangement with one of said legs and one of said beams, and one or more fasteners extend through aligned reception holes in the stacked arrangement.

27. A carrier device comprising:
   a U-shaped frame having an intermediate section and first and second legs;
   a vehicle mount device having a vehicle connection means and U-shaped frame attachment means;
   a pair of rails which are spaced apart along said legs and each extend laterally out away from opposite outer sides of said legs to provide cantilever extensions to each side of said U-shaped frame structure;
   a wheel mount provided on each of said rails, and said wheel mount being slideably received by a respective one of said cantilever extensions.

28. The carrier device of claim 27 further comprising a securement device and each of said intermediate section and legs having securement means for securing said securement device in three optional positions, and said securement device having a vertically rising post and a lock receptor on said post.

29. The carrier device of claim 28 wherein said securement means includes a fastener which also secures said vehicle mount device to said U-shaped frame structure.

30. The carrier device of claim 29 wherein said fastener extends through the intermediate section.

31. The carrier device of claim 29 wherein said vehicle mount device includes a pair of laterally spaced apart beams and said fastener extends through one of said legs and one of said beams in securing said securement device to said U-shaped frame.

32. The carrier device of claim 27 wherein said vehicle mount device includes a pair of laterally spaced apart beams which are in a stacked arrangement with said legs and secured to said legs.

33. The carrier device of claim 27 further comprising a second rail spaced apart from said first rail along said legs;

a first beam secured to a first of said legs and extending in a direction out away from a free end of said first leg;

a second beam secured to a second of said legs and extending in a direction out away from a free end of said second leg;

a third rail supported by and extending between and laterally out away from said beams.

* * * * *